(12) United States Patent
Su et al.

(10) Patent No.: US 8,773,970 B2
(45) Date of Patent: Jul. 8, 2014

(54) METHOD AND DEVICE FOR DETECTING A SIGNAL IN A LONG TERM EVOLUTION SYSTEM

(75) Inventors: Xiaoming Su, Shenzhen (CN); Yujie Li, Shenzhen (CN); Qiaoyan Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 329 days.

(21) Appl. No.: 13/258,438

(22) PCT Filed: Apr. 2, 2010

(86) PCT No.: PCT/CN2010/071528
§ 371 (c)(1),
(2), (4) Date: Jan. 13, 2012

(87) PCT Pub. No.: WO2011/011994
PCT Pub. Date: Feb. 3, 2011

(65) Prior Publication Data
US 2012/0099451 A1    Apr. 26, 2012

(30) Foreign Application Priority Data
Jul. 29, 2009  (CN) .......................... 2009 1 0090136

(51) Int. Cl.
*H04J 11/00*  (2006.01)
*H04L 27/26*  (2006.01)
*H04W 28/04*  (2009.01)

(52) U.S. Cl.
CPC ........... *H04L 27/2601* (2013.01); *H04W 28/04* (2013.01)
USPC ............................ 370/208; 370/278; 370/328

(58) Field of Classification Search
CPC .................. H04L 25/03019; H04L 25/03057; H04B 1/707; H04B 2201/70706; H04B 7/0413
See application file for complete search history.

(56) References Cited

U.S. PATENT DOCUMENTS

| | | | |
|---|---|---|---|
| 2008/0287155 A1* | 11/2008 | Xu et al. | 455/522 |
| 2009/0068956 A1* | 3/2009 | Naito et al. | 455/67.11 |
| 2010/0279603 A1* | 11/2010 | Horiuchi et al. | 455/9 |

FOREIGN PATENT DOCUMENTS

| | | |
|---|---|---|
| CN | 1581751 A | 2/2005 |
| CN | 1711709 A | 12/2005 |

(Continued)

OTHER PUBLICATIONS

International Search Report in international application No. PCT/CN2010/071528, mailed on Jul. 15, 2010.
English Translation of the Written Opinion of the International Search Authority in international application No. PCT/CN2010/071528, mailed on Jul. 15, 2010.

(Continued)

*Primary Examiner* — Jung Park
(74) *Attorney, Agent, or Firm* — Oppedahl Patent Law Firm LLC

(57) ABSTRACT

The present disclosure discloses a method for detecting a signal in an LTE system, the method includes that: an eNodeB calculates a signal power $P_s$ and a noise power $P_n$ according to the data part of a signal sent by a UE on a channel resource, a Constant Amplitude Zero Auto-Correlation (CAZAC) sequence, an orthogonal sequence W distributed to the UE, and a sequence $W_n$ orthogonal to the W stored by itself; and the ratio of $P_s$ to $P_n$ is compared with a predetermined threshold and a corresponding detection result is determined according to the comparison result. The present disclosure further discloses a device for detecting a signal in an LTE system. The method and device can be used for accurately, simply and easily detecting whether the UE initiates a scheduling request or whether DTX occurs to the UE, so that the eNodeB can determine to whether to continuously send a subsequent message or whether to resend the message which the UE has failed to receive, thereby improving the scheduling performance of the eNodeB.

12 Claims, 2 Drawing Sheets

(56) References Cited

FOREIGN PATENT DOCUMENTS

| | | | |
|---|---|---|---|
| CN | 101383665 | A | 3/2009 |
| CN | 101409922 | A | 4/2009 |
| JP | 2005012830 | A | 1/2005 |
| JP | 2007060183 | A | 3/2007 |

OTHER PUBLICATIONS

Ericsson, Scheduling Request in E-UTRAN, 3GPP TSG-RAN WG2 #47bis, R1-070471 Jan. 9, 2007.

Huawei, ZTE, Multiplexing of Scheduling Request Indicator, 3GPP TSG-RAN WG1 Meeting #50, R1-073521 Aug. 20, 2007.

* cited by examiner

METHOD AND DEVICE FOR DETECTING A SIGNAL IN A LONG TERM EVOLUTION SYSTEM

TECHNICAL FIELD

The present disclosure relates to the field of a signal detection technology, in particular to a method and device for detecting a signal in a Long Term Evolution (LTE) system.

BACKGROUND

A LTE system is evolved from the third generation (3G) mobile communication system, improves and enhances the air access technology of the 3G system, and uses Orthogonal Frequency Division Multiplexing (OFDM) and Multiple Input Multiple Output (MIMO) as a unique standard of the evolution of its wireless network. A downlink peak rate of 100 Mbit/s and an uplink peak rate of 50 Mbit/s can be provided under a spectral bandwidth of 20 MHz to improve the performance of a cell-edge user, increase cell capacity and reduce system delay.

In an existing LTE system, a User Equipment (UE), when in a scheduling request period, can initiate a scheduling request to an evolved Node B (eNodeB) in an uplink subframe through a Physical Uplink Control Channel (PUCCH), which is in a format of 1, according to the requirement of a user, such as requirement of expanding resource; if there is no requirement of the user, the UE will not send information to the eNodeB even in a scheduling request period. Here, the PUCCH is divided into various formats, such as 1, 1a and 1b, according to different transmitted contents. Therefore, in the related technologies, the eNodeB needs to detect whether the UE sends a scheduling request to perform processing of the subsequent message.

In the operation process of the LTE system, the UE needs to perform feedback to a Physical Downlink Control Channel (PDCCH) and a Physical Downlink Shared Channel (PDSCH) in an eNodeB downlink subframe in a feedback period; if the UE detects a PDCCH and the Cyclic Redundancy Check (CRC) of the PDSCH is correct, the confirmation information fed back by the UE in the uplink subframe is Acknowledge (ACK) information; and if the UE detects a PDCCH and the CRC of the PDSCH is wrong, the confirmation information fed back by the UE in the uplink subframe is Non-Acknowledge (NACK) information. Here, if the UE feeds back ACK information of 1 bit or NACK information of 1 bit, the PUCCH in a format of 1a is adopted; if the UE feeds back ACK information of 2 bits or NACK information of 2 bits, the PUCCH in a format of 1b is adopted. If the UE fails to detect a PDCCH, it will not feed back the ACK or NACK information, i.e., the discontinuous transmission (DTX) occurs, which means that there is packet loss in the data transmitted from the eNodeB. If the UE feeds back the ACK or NACK information, the continuous transmission (CTX) occurs. Therefore, in the related technologies, the eNodeB needs to detect whether DTX occurs to the UE to perform processing of the subsequent message.

At present, it is impossible to detect whether the UE has sent a scheduling request or whether DTX occurs to the UE in the related technologies.

SUMMARY

Therefore, the main objective of the present disclosure is to provide a method and device for detecting a signal in an LTE system, so as to precisely, and simply and easily detect whether the UE initiates a scheduling request or whether DTX occurs to the UE.

In order to achieve the above objective, the technical solution of the present disclosure is implemented as follows.

The present disclosure provides a method for detecting a signal in an LTE system, including:

receiving, by an eNodeB, a data part of a signal sent by a UE on a channel resource;

calculating, by the eNodeB, a signal power $P_s$ and noise power $P_n$ according to the received data part of the signal sent by the UE on the channel resource, a Constant Amplitude Zero Auto-Correlation (CAZAC) sequence, an orthogonal sequence W distributed to the UE, and a sequence $W_n$ orthogonal to the W and stored by the eNodeB; and comparing a ratio of $P_s$ to $P_n$ with a predetermined threshold, and determining a corresponding detection result according to a comparison result.

Wherein the step of calculating $P_s$ may be specifically as follows:

performing a multiplication between the data part of the signal sent by the UE on the channel resource and a conjugate of the CAZAC sequence, and performing a summation of the multiplication to get a summation result; then performing a multiplication between the summation result and a conjugate of the orthogonal sequence W distributed to the UE, and performing a summation of the multiplication performed between the summation result and a conjugate of the orthogonal sequence W to get a second summation result; and squaring a modulus of the second summation result to obtain P.

Wherein the step of calculating $P_n$ may be specifically as follows:

performing a multiplication between the data part of the signal sent by the UE on the channel resource and a conjugate of the CAZAC sequence and performing a summation of the multiplication to get a summation result, then performing a multiplication between the summation result and a conjugate of the sequence $W_n$ and performing a summation of the multiplication performed between the summation result and a conjugate of the sequence $W_n$ to get a second summation result; and squaring a modulus of the second summation result to obtain $P_n$.

In the solution, when the UE is in a scheduling request period, the step of determining the corresponding detection result according to the comparison result may be:

when the ratio of $P_s$ to $P_n$ is more than or equal to the predetermined threshold, it is determined that the UE sends a scheduling request; and when the ratio of $P_s$ to $P_n$ is less than the predetermined threshold, it is determined that the UE does not send the scheduling request.

In the solution, when the UE is in a feedback period, the step of determining the corresponding detection result according to the comparison result may be:

when the ratio of $P_s$ to $P_n$ is more than or equal to the predetermined threshold, it is determined that CTX occurs to the UE; and, when the ratio of $P_s$ to $P_n$ is less than the predetermined threshold, it is determined that DTX occurs to the UE.

In this solution, the sequence $W_n$ may be: W3=[+1 +1 −1 −1].

The present disclosure further provides a device for detecting a signal in an LTE system, including: a receiving module, a power calculating module, a ratio calculating module and a comparing module, wherein the receiving module is arranged to receive a data part of a signal sent by a UE on a channel resource and send the data part to the power calculating module;

the power calculating module is arranged to calculate $P_s$ and $P_n$ according to the data part sent by the receiving module, a CAZAC sequence distributed to the UE, an orthogonal sequence W distributed to the UE, and a sequence $W_n$ orthogonal to the W and stored by the eNodeB, and send a calculation result to the ratio calculating module;

the ratio calculating module is arranged to calculate a ratio of the $P_s$ to the $P_n$ sent by the power calculating module, and send the calculated ratio to the comparing module; and the comparing module is arranged to compare the ratio sent by the ratio calculating module with a predetermined threshold, and determine a corresponding detection result according to a comparison result.

Wherein the power calculating module may further include a multiplication and summation module and a modulus squaring module, wherein the multiplication and summation module is arranged to perform a multiplication between the data part of the signal from the receiving module to which the UE sends the signal on the channel resource and a conjugate of the CAZAC sequence stored by the eNodeB and performing a summation of the multiplication to get a summation result, then performing a multiplication between the summation result and a conjugate of the orthogonal sequence W distributed to the UE and stored by the eNodeB and perform a summation of the multiplication performed between the summation result and a conjugate of the orthogonal sequence W to get a final calculation result, and send the final calculation result to the modulus squaring module; or the multiplication and summation module is arranged to perform a multiplication between the data part of the signal from the receiving module to which the UE sends the signal on the channel resource and a conjugate of the CAZAC sequence stored by the eNodeB and performing a summation of the multiplication to get a summation result, then performing a multiplication between the summation result and a conjugate of the sequence $W_n$ stored by the eNodeB and performing a summation of the multiplication performed between the summation result and a conjugate of the sequence $W_n$ to get a final calculation result, and send the final calculation result to the modulus squaring module; and the modulus squaring module is arranged to square a modulus of the result sent by the multiplication and summation module, and send a calculation result to the ratio calculating module;

correspondingly, the ratio calculating module is further arranged to calculate the ratio of $P_s$ to $P_n$ sent by the modulus squaring module and send the calculated ratio to the comparing module.

Wherein the power calculating module may calculate $P_s$ in the following way specifically: performing a multiplication between the data part of the signal sent by the UE on the channel resource and a conjugate of the CAZAC sequence and performing a summation of the multiplication to get a summation result, then performing a multiplication between the summation result and a conjugate of the orthogonal sequence W distributed to the UE and performing a summation of the multiplication performed between the summation result and a conjugate of the orthogonal sequence W to get a second summation result, and squaring a modulus of the second summation result to obtain $P_s$.

Wherein the power calculating module may calculate the $P_n$ in the following way specifically: performing a multiplication between the data part of the signal sent by the UE on the channel resource and a conjugate of the CAZAC sequence and performing a summation of the multiplication to get a summation result, then performing a multiplication between the summation result and a conjugate of the sequence $W_n$ and performing a summation of the multiplication performed between the summation result and a conjugate of the sequence $W_n$ to get a second summation result, and squaring a modulus of the second summation result to obtain $P_n$.

In the method and device for detecting a signal in an LTE system in the present disclosure, the eNodeB calculates the signal power $P_s$ and the noise power $P_n$ according to the data part of the signal sent by the UE on the channel resource, a CAZAC sequence and an orthogonal sequence W distributed to a UE, and a sequence $W_n$ orthogonal to the W and stored by itself, calculates the ratio of $P_s$ to $P_n$, compares the ratio with the predetermined threshold, and determines a corresponding detection result according to a comparison result. Through the present disclosure, the eNodeB can detect whether the UE initiates the scheduling request or whether DTX occurs to the UE, so that the eNodeB can determine whether to continuously send a subsequent message or whether to resend the message which the UE has failed to receive.

In the solution, due to the introduction of the sequence $W_n$, it is unnecessary to search unused channel resources during the calculation of the noise power $P_n$, thereby reducing the detection complexity; meanwhile, because the noise power is calculated through the sequence $W_n$, the precision of calculating the noise power is improved, thereby improving the accuracy of threshold decision and finally improving the scheduling performance of the eNodeB.

DETAILED DESCRIPTION

The basic idea of the present disclosure is to calculate a signal power $P_s$ and a noise power $P_n$ according to a sequence $W_n$, the data part of a signal sent by a UE on a channel resource, and the CAZAC sequence distributed to the UE and an orthogonal sequence W distributed to the UE, calculate the ratio of the $P_s$ to the $P_n$, compare the ratio with the predetermined threshold and determine a corresponding detection result according to the comparison result.

In the present disclosure, preferably, the sequence $W_n$ is W3=[+1 +1 −1 −1] and distributed by an eNodeB; the orthogonal sequence W distributed to the UE is: W0=[+1 +1 +1 +1], W1=[+1 −1 +1 −1] and W2=[+1 −1 −1 +1]; and for different users, the orthogonal sequence distributed to the UE can be any one of W0, W1 or W2, wherein 0, 1, 2 are indexes of the orthogonal sequences, and the CAZAC sequence, W0, W1, W2 and W3 are all distributed by the eNodeB.

In practical application, the UE generates data from the CAZAC sequence, orthogonal sequence W0, W1 or W2 and other related parameters distributed by an eNodeB, and then sends the generated data, as the data part of the signal sent by itself, to the eNodeB on a distributed channel resource; and the eNodeB calculates the $P_s$ and $P_n$ according to the received data part, the sequence $W_n$ stored by itself, and the CAZAC sequence distributed to the UE and the orthogonal sequence distributed to the UE, wherein the CAZAC sequence and orthogonal sequence W0, W1 or W2 are stored in both the eNodeB and UE.

The present disclosure is further described below with reference to drawings and specific embodiments in details.

Figure 1:
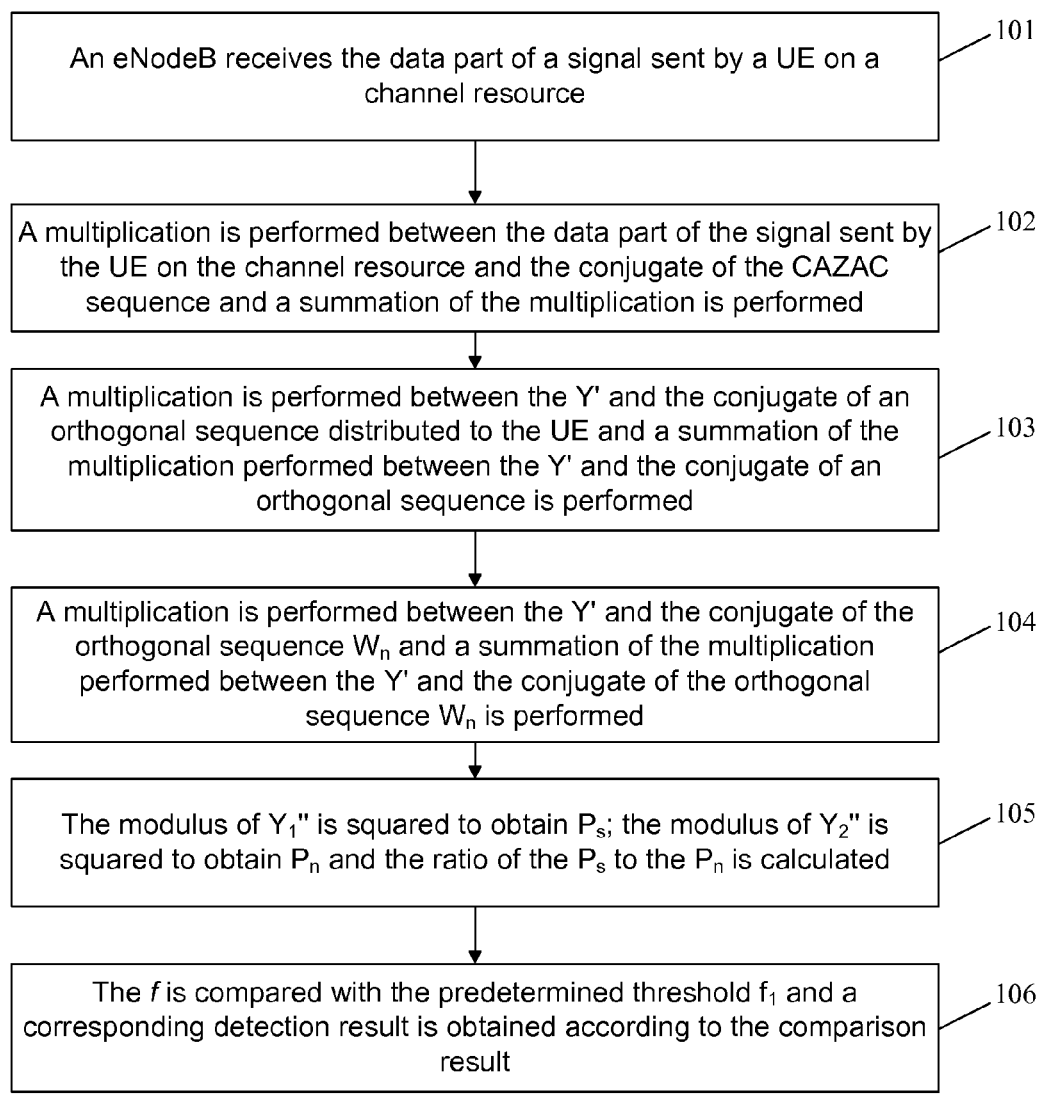
FIG. 1 shows a diagram illustrating a implementation flow of a method for is detecting a signal in an LTE system in the present disclosure.

FIG. 1 shows a diagram illustrating the implementation flow of a method for detecting a signal in an LTE system in the present disclosure, as shown in FIG. 1, the flow includes the following steps.

Step 101: an eNodeB receives the data part of a signal sent by a UE on a channel resource;

wherein the data part of the signal sent by the UE on the channel resource is the data generated from parameters distributed by the eNodeB, by the UE on the distributed channel resource;

wherein the parameters which are distributed by the eNodeB are: CAZAC sequence, and orthogonal sequence W0, W1 or W2.

Step 102: the eNodeB performs a multiplication between the data part of the signal sent by the UE on the channel resource and the conjugate of the CAZAC sequence and performs a summation of the multiplication, wherein this step can be represented by the formula (1):

$$Y' = \Sigma YC^* \quad (1)$$

wherein the Y is the data part of the signal sent by the UE on the channel resource, the C is the CAZAC sequence and the Y' is the result obtained by performing a multiplication between Y and the conjugate of the C, and performing a summation of the multiplication performed between Y and the conjugate of the C.

Step 103: a multiplication is performed between the Y' and the conjugate of the orthogonal sequence W distributed to the UE and a summation of the multiplication performed between the Y' and the conjugate of the orthogonal sequence W is performed, wherein this step can be represented by the formula (2):

$$Y_1'' = \Sigma Y'W^* \quad (2)$$

wherein the W is the orthogonal sequence distributed to the UE and can be W0, W1 or W2; and the $Y_1''$ is the result obtained by performing a multiplication between the Y' and the conjugate of the W and performing a summation of the multiplication performed between the Y' and the conjugate of the W.

Step 104: a multiplication is performed between the Y' and the conjugate of the orthogonal sequence $W_n$ and a summation of the multiplication performed between the Y' and the conjugate of the orthogonal sequence $W_n$ is performed, wherein this step can be represented by the formula (3):

$$Y_2'' = \Sigma Y'Wn^* \quad (3)$$

wherein the $W_n$ is preferably W3=[+1 +1 −1 −1], and $Y_2''$ is the result obtained by performing a multiplication between the Y' and the conjugate of the $W_n$ and performing a summation of the multiplication performed between the Y' and the conjugate of the $W_n$.

Step 105: the modulus of the $Y_1''$ is squared to obtain the $P_s$, the modulus of the $Y_2''$ is squared to obtain the $P_n$, and the ratio of the $P_s$ to the $P_n$ is calculated;

this step can be represented by the formula (4):

$$P_s = |Y_1''|^2, P_n = |Y_2''|^2 \text{ and } f = P_s/P_n \quad (4)$$

wherein f is the ratio of the $P_s$ to the $P_n$.

Step 106: the f is compared with a predetermined threshold $f_1$ and a corresponding detection result is determined according to the comparison result.

In the present disclosure, the predetermined threshold $f_1$ is the presented data predetermined and can ensure that: under the lowest signal to noise ratio required by the system, when the UE does not send a PUCCH in a format of 1, 1a or 1b, the possibility that the eNodeB detects the PUCCH in the format of 1, 1a or 1b sent by the UE is less than 0.01; when the UE sends a PUCCH in a format of 1, 1a or 1b, the possibility that the eNodeB detects the PUCCH in the format of 1, 1a or 1b sent by the UE is more than 0.99.

Figure 2:
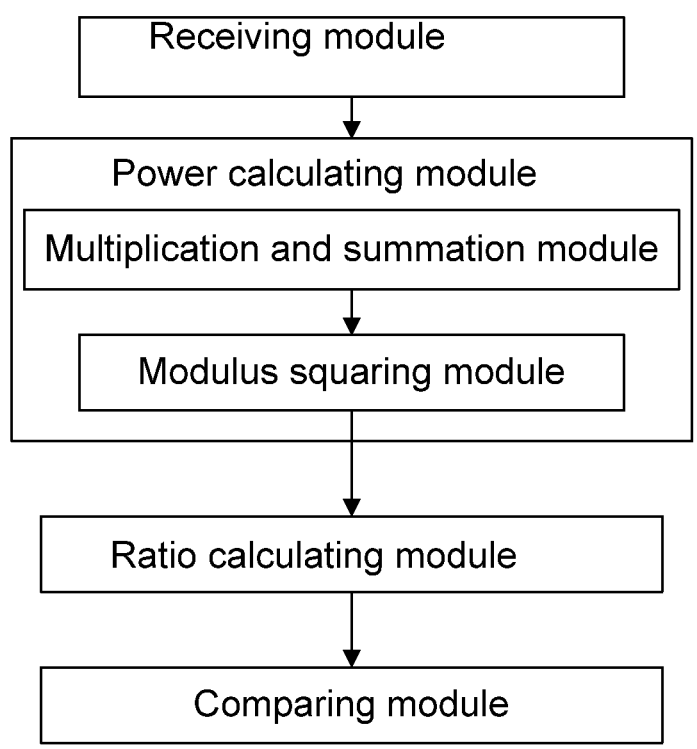
FIG. 2 shows a diagram illustrating a structure of a device for detecting a signal in an LTE system in the present disclosure.

To implement the method, the present disclosure further provides a device for detecting a signal in an LTE system, as shown in FIG. 2, the device includes: a receiving module, a power calculating module, a ratio calculating module and a comparing module, wherein the receiving module is arranged to receive the data part of a signal sent by a UE on a channel resource and send the received data part of the signal sent by the UE on the channel resource to the power calculating module;

the power calculating module is arranged to calculate $P_s$ and $P_n$ according to the data part sent by the receiving module, a CAZAC sequence distributed to the UE and an orthogonal sequence W distributed to the UE, and a sequence $W_n$ which is orthogonal to the W and stored by the eNodeB, and send the calculation result to the ratio calculating module;

wherein $P_s$ is calculated by the power calculating module specifically in the following way: performing a multiplication between the data part of the signal sent by the UE on the channel resource and the conjugate of the CAZAC sequence distributed to the UE and performing a summation of the multiplication to obtain a summation result, then performing a multiplication between the obtained summation result and the conjugate of the orthogonal sequence W distributed to the UE and performing a summation of the multiplication performed between the obtained summation result and the conjugate of the orthogonal sequence W, and squaring the modulus of the result of the second summation to obtain $P_s$;

$P_n$ is calculated by the power calculating module specifically in the following way: performing a multiplication between the data part of the signal sent by the UE on the channel resource and the conjugate of the CAZAC sequence distributed to the UE and performing a summation of the multiplication to obtain a summation result, then performing a multiplication between the obtained the summation result and the conjugate of the sequence $W_n$ and performing a summation of the multiplication performed between the obtained the summation result and the conjugate of the sequence $W_n$, and squaring the modulus of the second summation result to obtain $P_n$;

the ratio calculating module is arranged to calculate the ratio of $P_s$ to $P_n$ sent by the power calculating module and send the calculated ratio to the comparing module; and the comparing module is arranged to store a predetermined threshold, comparing the ratio sent by the ratio calculating module with the predetermined threshold, and determining a corresponding detection result according to different comparison results.

In addition, the power calculating module further includes a multiplication and summation module and a modulus squaring module, wherein the multiplication and summation module is arranged to perform a multiplication between the data part sent by the receiving module and the conjugate of the CAZAC sequence stored by the eNodeB and distributed to the UE and perform a summation of the multiplication to obtain a summation result, then perform a multiplication between the obtained summation result and the conjugate of the orthogonal sequence W distributed to the UE and stored by the eNodeB and perform a summation of the multiplication performed between the obtained summation result and the conjugate of the orthogonal sequence W to get a final calculation result, and send the final calculation result to the modulus squaring module; or the multiplication and summation module is arranged to perform a multiplication between the data part sent by the receiving module and the conjugate of the CAZAC sequence stored by the eNodeB and distributed to the UE and perform a summation of the multiplication to obtain a summation result, then perform a multiplication between the obtained summation result and the conjugate of the sequence $W_n$ stored by the eNodeB and perform a summation of the multiplication performed between the obtained summation result and the conjugate of the sequence $W_n$ to get a final calculation result, and send the final calculation result to the modulus squaring module; and the modulus squaring module is arranged to square the modulus of the result sent by the multiplication and summation module, and send the calculation result to the ratio calculating module;

correspondingly, the ratio calculating module is further arranged to calculate the ratio of $P_s$ to $P_n$ sent by the modulus squaring module, and send the obtained ratio by calculation to the comparing module.

The present disclosure is further described below with reference to three embodiments in details.

Embodiment 1

In the embodiment, when the UE is in a scheduling request period, the data part which belongs to a signal sent by a UE on a channel resource $CH_1$ and is received by an eNodeB is Y, and the orthogonal sequence distributed to the UE is $W0=[+1 +1 +1 +1]$. The detection result determined by the embodiment is to determine whether the UE sends a scheduling request so as to determine whether the eNodeB needs to reply to the scheduling request.

The implementation flow of the embodiment is as follows: a multiplication is performed between the Y and the conjugate of the CAZAC sequence distributed to the UE and a summation of the multiplication is performed to obtain Y'; a multiplication is performed between the Y' and the conjugate of the W0 and a summation of the multiplication is performed to obtain $Y_1''$; a multiplication is performed between the Y' and the conjugate of the sequence $W_n$ and a summation of the multiplication is performed to obtain $Y_2''$; the modulus of the $Y_1''$ is squared to obtain $P_s$; the modulus of the $Y_2''$ is squared to obtain $P_n$; the ratio of the $P_s$ to the $P_n$ is calculated to obtain f; the f is compared with the predetermined threshold $f_1$, if the f is more than or equal to the $f_1$, it is determined that the UE sends the scheduling request, and the eNodeB needs to reply to the scheduling request; if the f is less than the $f_1$, it is determined that the UE does not send the scheduling request and the eNodeB does not need to reply to the scheduling request and can continuously send subsequent messages.

Embodiment 2

In the embodiment, when the UE is in a feedback period, the data part which belongs to a signal sent by a UE on a channel resource $CH_2$ and is received by an eNodeB is Y, and the orthogonal sequence distributed to the UE is $W1=[+1 -1 +1 -1]$. The detection result determined by the embodiment is to determine whether the CTX occurs to the UE or DTX.

The implementation flow of the embodiment is as follows: a multiplication is performed between the Y and the conjugate of the CAZAC sequence distributed to the UE and a summation of the multiplication is performed to obtain Y'; a multiplication is performed between the Y' and the conjugate of the W1 and summation of the multiplication is performed to obtain $Y_1''$; a multiplication is performed between the Y' and the conjugate of the sequence $W_n$ and a summation of the multiplication is performed to obtain $Y_2''$; the modulus of the $Y_1''$ is squared to obtain $P_s$; the modulus of the $Y_2''$ is squared to obtain $P_n$; the ratio of the $P_s$ to the $P_n$ is calculated to obtain f; the f is compared with the predetermined threshold $f_1$, if the f is more than or equal to the $f_1$, it is determined that the CTX occurs to the UE; and if the f is less than the $f_1$, it is determined that DTX occurs to the UE and the eNodeB needs to resend the message which the UE fails to receive.

Embodiment 3

In the embodiment, when the UE is in both the scheduling request period and the feedback period, the channel resource of the signal which is sent from the UE to the eNodeB in the scheduling request period is $CH_1$ and the channel resource of the signal sent from the UE to the eNodeB in the feedback period is $CH_2$; correspondingly, the data parts on the channel resource $CH_1$ and the channel resource $CH_2$ are Y; and the orthogonal sequence distributed to the UE is $W2=[+1 -1 -1 +1]$. Here, the values of the data parts Y on the channel resource $CH_1$ and $CH_2$ are different. The detection result determined by the embodiment is to determine whether the UE sends the scheduling request and whether the CTX occurs to the UE or DTX.

The implementation flow of this embodiment is as follows.

Step 1: the eNodeB detects the signal sent by the UE in the scheduling request period at first;

specifically, a multiplication is performed between the data part Y of the signal sent by the UE on the channel resource $CH_1$ and the conjugate of the CAZAC sequence distributed to the UE and a summation of the multiplication performed between the data part Y and the conjugate of the CAZAC sequence is performed to obtain Y'; a multiplication is performed between the Y' and the conjugate of the W2 and a summation of the multiplication performed between the Y' and the conjugate of the W2 is performed to obtain $Y_1''$; a multiplication is performed between the Y' and the conjugate of the sequence $W_n$ and a summation of the multiplication performed between the Y' and the conjugate of the sequence $W_n$ is performed to obtain $Y_2''$; the modulus of the $Y_1''$ is squared to obtain $P_s$; the modulus of the $Y_2''$ is squared to obtain $P_n$; the ratio of $P_s$ to $P_n$ is calculated to obtain f; the f is compared with the predetermined threshold $f_1$, if f is more than or equal to $f_1$, it is determined that the UE sends the scheduling request and CTX occurs to the UE and the signal detection is ended; and if f is less than $f_1$, step 2 is executed.

Step 2: the eNodeB detects the signal sent by the UE in the feedback period;

specifically, a multiplication is performed between the data part Y of the signal sent by the UE on the channel resource $CH_2$ and the conjugate of the CAZAC sequence distributed to the UE and a summation of the multiplication performed between the data part Y and the conjugate of the CAZAC sequence is performed to obtain Y'; a multiplication is performed between the Y' and the conjugate of the W2 and a summation of the multiplication performed between the Y' and the conjugate of the W2 is performed to obtain $Y_1''$; a multiplication is performed between the Y' and the conjugate of the sequence $W_n$ and summation of the multiplication performed between the Y' and the conjugate of the sequence $W_n$ is performed to obtain $Y_2''$; the modulus of the $Y_1''$ is squared to obtain $P_s$; the modulus of $Y_2''$ is squared to obtain $P_n$; the ratio of $P_s$ and $P_n$ is calculated to obtain f; the f is compared with the is predetermined threshold $f_1$, if f is more than or equal to $f_1$, it is determined that CTX occurs to the UE and does not send the scheduling request; and if f is less than $f_1$, it is determined that DTX occurs to the UE and does not send the scheduling request. The value of the predetermined threshold $f_1$ here is different from that of the predetermined threshold $f_1$ in step 1.

The described above are only preferred embodiments of the present disclosure, and not intended to limit the scope of protection of the present disclosure. Any modifications, equivalent replacements, improvements and the like within the spirit and principle of the present disclosure shall fall within the scope of protection of the present disclosure.

What is claimed is:

1. A method for detecting a signal in an LTE system, comprising:
   receiving, by an eNodeB, a data part of a signal sent by a UE on a channel resource;
   calculating, by the eNodeB, a signal power $P_s$ and a noise power $P_n$ according to the received data part of the signal sent by the UE on the channel resource, a Constant Amplitude Zero Auto-Correlation (CAZAC) sequence, an orthogonal sequence W distributed to the UE, and a sequence $W_n$ orthogonal to the W and stored by the eNodeB; and
   comparing a ratio of $P_s$ to $P_n$ with a predetermined threshold, and determining a corresponding detection result according to a comparison result;
   wherein the step of calculating $P_s$ is specifically as follows:
   performing a multiplication between the data part of the signal sent by the UE on the channel resource and a conjugate of the CAZAC sequence and performing a summation of the multiplication to get a summation result; then performing a multiplication between the summation result and a conjugate of the orthogonal sequence W distributed to the UE, and performing a summation of the multiplication performed between the summation result and a conjugate of the orthogonal sequence W to get a second summation result; and squaring a modulus of the second summation result to obtain $P_s$.

2. The method according to claim 1, wherein the step of calculating $P_n$ is specifically as follows:
   performing a multiplication between the data part of the signal sent by the UE on the channel resource and a conjugate of the CAZAC sequence and performing a summation of the multiplication to get a summation result, then performing a multiplication between the summation result and a conjugate of the sequence $W_n$ and performing a summation of the multiplication performed between the summation result and a conjugate of the sequence $W_n$ to get a second summation result; and squaring a modulus of the second summation result to obtain $P_n$.

3. The method according to claim 2, when the UE is in a scheduling request period, the step of determining the corresponding detection result according to the comparison result is:
   when the ratio of $P_s$ to $P_n$ is more than or equal to the predetermined threshold, it is determined that the UE sends a scheduling request; and when the ratio of $P_s$ to $P_n$ is less than the predetermined threshold, it is determined that the UE does not send the scheduling request.

4. The method according to claim 2, when the UE is in a feedback period, the step of determining the corresponding detection result according to the comparison result is:
   when the ratio of $P_s$ to $P_n$ is more than or equal to the predetermined threshold, it is determined that CTX (continuous transmission) occurs to the UE; and, when the ratio of $P_s$ to $P_n$ is less than the predetermined threshold, it is determined that DTX (discontinuous transmission) occurs to the UE.

5. The method according to claim 2, the sequence $W_n$ is: W3=[+1 +1−1−1].

6. The method according to claim 1, when the UE is in a scheduling request period, the step of determining the corresponding detection result according to the comparison result is:
   when the ratio of $P_s$ to $P_n$ is more than or equal to the predetermined threshold, it is determined that the UE sends a scheduling request; and when the ratio of $P_s$ to $P_n$ is less than the predetermined threshold, it is determined that the UE does not send the scheduling request.

7. The method according to claim 1, when the UE is in a feedback period, the step of determining the corresponding detection result according to the comparison result is:
   when the ratio of $P_s$ to $P_n$ is more than or equal to the predetermined threshold, it is determined that CTX (continuous transmission) occurs to the UE; and, when the ratio of $P_s$ to $P_n$ is less than the predetermined threshold, it is determined that DTX (discontinuous transmission) occurs to the UE.

8. The method according to claim 1, the sequence $W_n$ is: W3=[+1 +1−1−1].

9. A device for detecting a signal in an LTE system, comprising: a receiving module, a power calculating module, a ratio calculating module and a comparing module, wherein
   the receiving module is arranged to receive a data part of a signal sent by a UE on a channel resource and send the data part to the power calculating module;
   the power calculating module is arranged to calculate a signal power $P_s$ and a noise power $P_n$ according to the data part sent by the receiving module, a CAZAC sequence distributed to the UE, an orthogonal sequence W distributed to the UE, and a sequence $W_n$ orthogonal to W and stored by the eNodeB, and send a calculation result to the ratio calculating module;
   the ratio calculating module is arranged to calculate a ratio of $P_s$ to $P_n$ sent by the power calculating module, and send the calculated ratio to the comparing module; and
   the comparing module is arranged to compare the ratio sent by the ratio calculating module with a predetermined threshold, and determine a corresponding detection result according to a comparison result;
   wherein the power calculating module calculates $P_s$ in the following way specifically: performing a multiplication between the data part of the signal sent by the UE on the channel resource and a conjugate of the CAZAC sequence and performing a summation of the multiplication to get a summation result, then performing a multiplication between the summation result and a conjugate of the orthogonal sequence W distributed to the UE and performing a summation of the multiplication performed between the summation result and a conjugate of the orthogonal sequence W to get a second summation result, and squaring a modulus of the second summation result to obtain $P_s$.

10. The device according to claim 9, wherein the power calculating module further comprises a multiplication and summation module and a modulus squaring module, wherein
    the multiplication and summation module is arranged to perform a multiplication between the data part of the signal from the receiving module to which the UE sends the signal on the channel resource and a conjugate of the CAZAC sequence stored by the eNodeB and perform a summation of the multiplication to get a summation result, then perform a multiplication between the summation result and a conjugate of the orthogonal sequence W distributed to the UE and stored by the eNodeB, and perform a summation of the multiplication performed between the summation result and a conjugate of the orthogonal sequence W to get a final calculation result and send the final calculation result to the modulus squaring module; or the multiplication and summation module is arranged to perform a multiplication between the data part of the signal from the receiving module to which the UE sends the signal on the channel resource and a conjugate of the CAZAC sequence stored by the eNodeB and perform a summation of the multiplication to get a summation result, then performing a multiplication between the summation result and a conjugate of the sequence $W_n$ stored by the eNodeB and perform a summation of the multiplication performed between the summation result and a conjugate of the sequence $W_n$ to get a final calculation result, and send the final calculation result to the modulus squaring module; and the modulus squaring module is arranged to square a modulus of the result sent by the multiplication and summation module and send a calculation result to the ratio calculating module;

correspondingly, the ratio calculating module is further arranged to calculate a ratio of $P_s$ to $P_n$ sent by the modulus squaring module and send the calculated ratio to the comparing module.

11. The device according to claim 10, wherein the power calculating module calculates the $P_n$ in the following way specifically: performing a multiplication between the data part of the signal sent by the UE on the channel resource and a conjugate of the CAZAC sequence and performing a summation of the multiplication to get a summation result, then performing a multiplication between the summation result and a conjugate of the sequence $W_n$ and performing a summation of the multiplication performed between the summation result and a conjugate of the sequence $W_n$ to get a second summation result, and squaring a modulus of the second summation result to obtain $P_n$.

12. The device according to claim 9, wherein the power calculating module calculates the $P_n$ in the following way specifically: performing a multiplication between the data part of the signal sent by the UE on the channel resource and a conjugate of the CAZAC sequence and performing a summation of the multiplication to get a summation result, then performing a multiplication between the summation result and a conjugate of the sequence $W_n$ and performing a summation of the multiplication performed between the summation result and a conjugate of the sequence $W_n$ to get a second summation result, and squaring a modulus of the second summation result to obtain $P_n$.

* * * * *